Aug. 25, 1942.　　　E. WILDHABER　　　2,294,014

GEAR CUTTING MACHINE

Filed Sept. 24, 1938　　　2 Sheets-Sheet 1

INVENTOR
Ernest Wildhaber
BY
ATTORNEY

Aug. 25, 1942.  E. WILDHABER  2,294,014
GEAR CUTTING MACHINE
Filed Sept. 24, 1938  2 Sheets-Sheet 2

INVENTOR
Ernest Wildhaber
BY
ATTORNEY

Patented Aug. 25, 1942

2,294,014

UNITED STATES PATENT OFFICE 2,294,014

GEAR CUTTING MACHINE

Ernest Wildhaber, Brighton, N. Y., assignor to Gleason Works, Rochester, N. Y., a corporation of New York Application September 24, 1938, Serial No. 231,569

7 Claims. (Cl. 90—9)

The present invention relates to machines for cutting gears and particularly to machines for cutting gears with a rotary disc-type cutter by feed of the rotating cutter across the face of the gear blank. In a more specific aspect, the invention relates to machines for cutting gears by the "Revacycle" process where the rotary disc cutter, that is employed, has a plurality of cutting blades arranged part-way only around its periphery, and the gear blank is indexed on each revolution of the cutter when the gap between the blades is abreast of the blank. In this latter aspect, the machine of the present invention constitutes an improvement over the machine of the pending United States patent application of myself and Clarence T. Galloway, Serial No. 215,188, filed June 22, 1938.

In previous designs of machines employing disc-type gear cutters, the cutter has been journaled in a slide that is reciprocated by a cam which is journaled in the base of the machine and which is operatively connected with the slide by suitable means including a cam follower. For machines of the "Revacycle" type, where the movement of the cutter across the face of the gear blank is timed to the cutter rotation, different cams have had to be employed to cut gears of different widths of face and the cutter has had to be made especially to suit the job which is to be cut. Further than this, in previous designs of machines, a spring or hydraulic pressure has been employed to hold the follower against the cam during movement of the cutter across the face of the blank. This has required extra power to drive the cutter and moreover has subjected cam and follower to excess wear.

One object of the present invention is to provide a smaller, more compact and a simpler machine than disc-type gear cutting machines of previous design.

Another object of the invention is to provide a machine for cutting gears according to the "Revacycle" process which will be more universal in use than machines of this type previously built and which will make possible the extension of the "Revacycle" process to the limited production field and even to jobbing work.

A still further object of the invention is to provide a machine in which the drive to the cutter will incorporate within itself means for offsetting or fully balancing the cutting thrusts so that the use of springs or hydraulic pressure may be eliminated and thus a saving in the power required to drive the cutter and a reduction of wear on the cam and follower may be effected.

Other objects of the invention will be apparent hereinafter from the specification and from the recital of the appended claims when taken in conjunction with the accompanying drawings.

In a machine built according to the preferred embodiment of this invention, the cam, which controls the movement of the cutter across the face of the gear blank, is mounted directly on the cutter spindle. Thereby the machine construction is simplified and the machine itself may be made smaller and more compact. Further, a follower is preferably provided that has a straight contacting surface and this follower is preferably mounted for adjustment about an axis parallel to or coinciding with the axis of the cutter spindle so that the contacting surface of the follower may be inclined at different angles to the path of movement of the cutter. Thereby, the same cam may be employed to produce different lengths of stroke and, moreover, the range of any given cutter may be increased. This makes it practical to use the "Revacycle" process for cutting gears of limited production because with a few cutters, a wide range of gears may be cut.

In a machine constructed according to the present invention, there is preferably also incorporated in the drive to the cutter spindle a pair of helical gears or an equivalent drive means whose hand and helix angle are so selected as to offset or even fully balance the cutting thrust. Thus, there may be embodied in the cutter-drive itself, a means for offsetting the cutting thrust and a saving in power and reduction of wear may be achieved.

Figure 1:
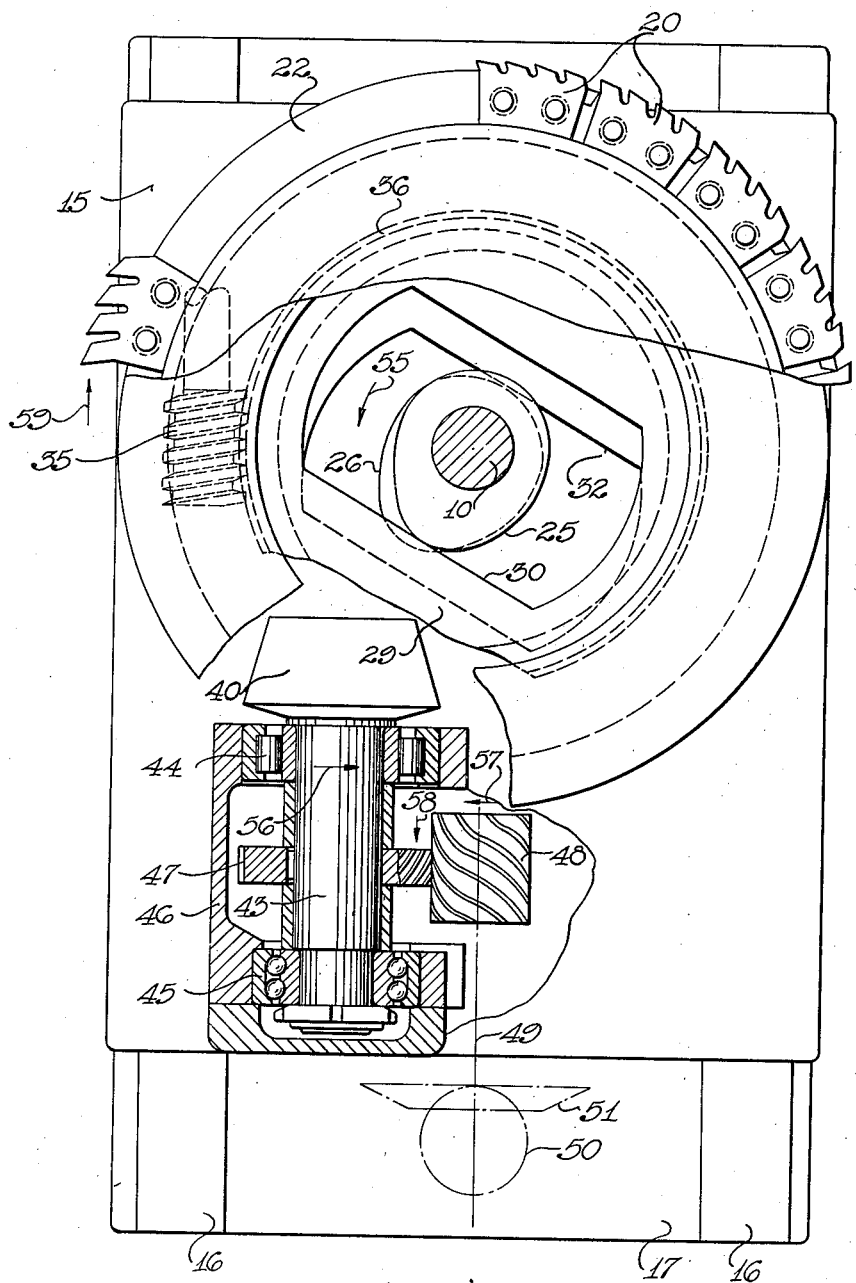
Fig. 1 is a more or less diagrammatic plan view, with parts broken away, showing the cutter end of a "Revacycle" machine built according to one embodiment of this invention.
Figure 2:
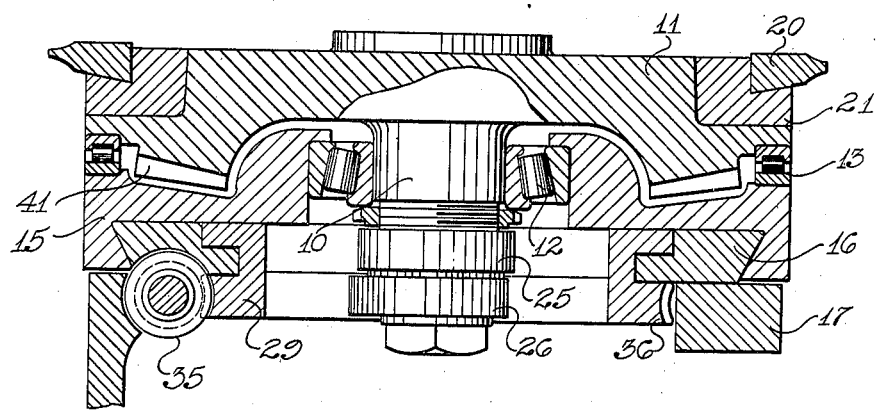
Fig. 2 is a sectional view through the cutter spindle of this machine.

Referring now to the drawings, 10 denotes the cutter spindle of the machine. This spindle has an enlarged head designated at 11. It is journaled by means of the radial bearing 12 and a large axial thrust bearing 13 upon a slide 15 that is reciprocable on ways 16 of the bed or frame 17 of the machine.

The cutter is secured in any suitable manner to the head 11 of the cutter spindle. The cutter shown in the drawings is of the "Revacycle"

type. It has a plurality of cutting segments 20 which are arranged part-way only around the periphery of the cutter head 21 and there is a gap 22 between the last and first segments of the cutter to permit of indexing a gear blank, when the gap is abreast of the blank, without relative withdrawal of the cutter from the blank. The cutter forms no part of the present invention and may be of the construction described in either of my prior applications, Serial Nos. 164,-340 and 181,177, now Patent 2,267,181, December 23, 1941, filed September 17, 1937, and December 22, 1937, respectively. The cutter is intended to cut according to the principles of these applications and as it rotates in engagement with a tooth space of the gear blank, it is fed longitudinally of the tooth space to cut the tooth space from end to end.

Figure 3:
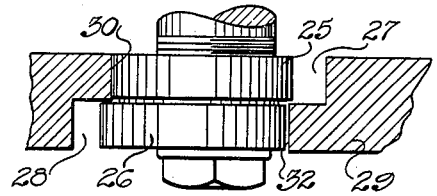
Fig. 3 is a fragmentary sectional view taken at right angles to the view of Fig. 2, showing in further detail the feed cam and follower.

The longitudinal feed movement of the cutter is produced in the machine illustrated in the present drawings by means of a pair of cams 25 and 26 that are removably secured to the cutter spindle 10. The cam 25 serves to move the slide 15 in one direction while the cam 26 serves to effect movement of the slide in the opposite direction. The cams 25 and 26 project through approximately rectangular slots 27 and 28 which are formed one above the other in a follower member 29 and which are slightly offset from one another as clearly shown in Figs. 1 and 3. The slot 27 is wider than the greatest width of the cam 25 and the slot 28 is wider than the greatest width of the cam 26. The cam 25 is adapted to cooperate with the straight side 30 at one side of slot 27 and the cam 32 is adapted to cooperate with the straight side 32 at the opposite side of slot 28. The two cams are positioned relative to one another so that when one of the cams is in engagement with a straight contacting surface of the follower member, the other cam will be slightly spaced from the straight contacting surface with which it is adapted to cooperate. Thus only one of the cams will be in driving engagement with the follower member at a time. The follower member is mounted in the frame 17 of the machine for rotatable adjustment about an axis parallel to and at one time coinciding with the axis of the cutter spindle 10 so that the straight sides 30 and 32 of the follower member may be adjusted at different angles to the direction of movement of the slide 15. Thereby, the throw of the cams may be varied and the range of use of a gear cutter may be increased. The angular adjustment of the follower member 29 may be effected by manual rotation of a worm 35 that meshes with a worm wheel 36 that is integral with the follower member. The worm 35 is journaled in the frame 17 of the machine.

The drive to the cutter spindle is through a hypoid pinion 40 and a hypoid gear 41. The gear 41 may be integral with or secured in any suitable manner to the enlarged head 11 of the cutter spindle. The pinion 40 is secured to or integral with a shaft 43 that is journaled by means of suitable anti-friction bearings 44 and 45 in a bracket 46 which is integral with or secured to the slide 15. A helical gear 47 is keyed or otherwise fixedly secured to the shaft 43. This gear 47 meshes with and is driven by a long-faced helical pinion 48. The pinion 48 is fixedly secured to a shaft, whose axis is denoted at 49, which is journaled in the frame 17 of the machine. This shaft may be driven by the bevel gears 50 and 51.

A feature of the invention is the selection of the hand and helix angle of the helical drive gears so that the cutting pressure will be offset or balanced during the cutting operation especially if the cutter is cutting while the slide is moving in a direction such as to produce a climb-cut. In the instance shown in the drawings, the cutter is assumed to be rotating in the direction of the arrow 55. This calls for rotation of the drive pinion 40 and helical gear 47 in the direction of the arrow 56 and for rotation of the helical pinion 48 in the direction of the arrow 57. The hand of helix of the helical gears 47 and 48 is then so selected that during the cut the helical pinion teeth exert a tooth pressure opposed to the cutting pressure and, of course, normal to their helix. The axial component of this pressure is in the direction of the arrow 58. It can be made to balance the tangential pressure 59 of the cut by suitably selecting the lead or helix angle of the helical gears 47 and 48. Then the cutting pressure loses its tendency to push the slide 15 along and the climb-cut is just as easy to handle as the conventional cut.

In the "Revacycle" process, where the rotating cutter is fed across the face of the gear blank in both directions successively during the cut, complete balance between the axial component of pressure of the teeth of the helical drive gears and the cutting thrust is preferably employed. In other processes, where the rotating cutter cuts only during feed in one direction and a climb-cut is used exclusively, an overbalance may be provided if desired so that the axial tooth load 58 is larger than the cutting pressure 59. Then the large load tends to reduce the thickness of the chip being cut.

The helix angle required for the teeth of the helical gears 47 and 48 can be determined very readily as follows. If we assume at first that there is no friction loss, then the torque exerted by the force 59 is equal to the torque exerted on the pinion 48 multiplied by the ratio $N/n$ of the hypoid gear and pinion 41, 40, where N is the number of teeth in the gear 41 and $n$ is the number of teeth in the pinion 40. Let R denote the cutter radius and $r$ the pitch radius of gear 47. Let P equal the tangential force 59 which must be equal to the axial thrust load 58 if complete balance is to be obtained. The tangential tooth load on gear 47 is equal to the thrust load P divided by $\tan \psi$, where $\psi$ denotes the helix angle or tooth inclination of the teeth of the gear 47.

Hence:

$$\frac{P}{\tan \psi} \cdot r \cdot \frac{N}{n} = P.R$$

and $$\frac{r}{\tan \psi} = \frac{n}{N} \cdot R$$

The lead L of the teeth of the helical gear 47 is then:

$$L = 2\pi \frac{r}{\tan \psi} = \frac{n}{N} \cdot (2\pi R)$$

or $$\tan \psi = \frac{r}{R} \cdot \frac{N}{n}$$

The mounting of the feed cam on the cutter spindle 10 has been found to alter the condition very little and the same is true of friction. It should be noted that the lead L of the teeth of the helical gears 47 and 48 depends on the cutter radius. Hence for complete balance, the helical pair 47, 48 should be changed when the cutter diameter is changed.

Instead of driving through helical gears, the drive pinion 40 may be driven from the main drive shaft 49 through helical splines. When the lead of the helical splines is selected on the same basis as the lead of the teeth of the helical gears, the same result can be obtained.

Only the cutter end of the machine has been illustrated in the drawings. If the machine is built for cutting tapered gears, the work holder should have provision for adjustment radially of the cutter axis and for lateral adjustment, a vertical adjustment in the direction of the cutter axis and a pitch angle adjustment about the cone apex of the gear to be cut, and may be constructed in the same way as in the machine of the joint application of myself and Clarence T. Galloway above mentioned. If the angular adjustment is sufficient to enable the work spindle to be adjusted parallel to the direction of movement of the slide 15, the machine can be made universal and used for the cutting of spur gears as well as tapered gears.

While the invention has been described in connection with a particular embodiment thereof, it will be understood that this application is intended to cover any variations, uses, or adaptations of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. In a machine for producing gears, a frame, a slide movable on the frame, a disc-type rotary cutter journaled in said slide, means for rotating the cutter, and means for reciprocating the slide comprising a cam and a follower, one of which is mounted on the slide and the other on the frame, said follower having a straight surface engaging said cam and being adjustable to vary the inclination of said surface to the direction of movement of the slide.

2. In a machine for producing gears, a slide, a cutter spindle journaled in said slide, a disc-type gear cutter secured to said spindle, a cam secured to said spindle to rotate therewith, a follower having a straight contacting surface adapted to engage said cam, said follower being secured to a relatively fixed part of the machine and being adjustable thereon about an axis extending in the direction of the axis of the cutter spindle to vary the inclination of said straight contacting surface to the path of movement of the slide, and means for rotating said spindle.

3. In a machine for producing gears, a disc-type rotary cutter, and helical drive means for rotating said cutter, said helical drive means being mounted to rotate about an axis perpendicular to a plane containing the axis of the cutter and having a hand of helix selected to exert an axial pressure in a direction opposite to the direction of the tangential cutting pressure on the cutter.

4. In a machine for producing gears, a disc-type rotary cutter, and means for driving said cutter including a pair of helical gears that are mounted to rotate on axes extending in the direction of tangential cutting pressure on the cutter, the hands of said gears being selected to exert an axial pressure in a direction opposite to the direction of the tangential cutting pressure, and the helix angle of said gears being selected to offset to a predetermined extent said tangential pressure.

5. In a machine for producing gears, a rotary disc-type gear cutter, means for driving said cutter to impart rotary motion thereto, means for simultaneously effecting reciproating movement of the cutter, and means incorporated in the rotary drive to the cutter for exerting an axial pressure in a direction opposite to the direction of tangential cutting pressure of the cutter to offset the cutting thrusts of the cutter.

6. In a machine for producing gears, a reciprocable slide, a cutter spindle journaled in said slide, a disc-type gear cutter secured to the spindle, a pair of cams secured to the spindle to rotate therewith, one of said cams being adapted to control the movement of the slide in one direction and the other of said cams being adapted to control the movement of the slide in the opposite direction, a follower adjustably secured to a relatively fixed part of the machine and having a slot formed therein to receive the cams, said slot being bounded at one side by a plane surface which is adapted to engage the periphery of one cam and being bounded at the opposite side by a plane surface adapted to engage the periphery of the other cam, the distance between said plane surfaces being such that only one cam is in engagement with a cooperating plane surface at a time, and means for adjusting the follower angularly about an axis extending in the direction of the axis of the cutter spindle to vary the inclination of the plane surfaces of the follower to the path of movement of the slide.

7. In a machine for producing gears, a rectilinearly reciprocable slide, a frame having spaced guideways on which the slide reciprocates, a cutter spindle having an enlarged head at one end thereof, a cam secured to said spindle at the opposite end thereof, a pair of anti-friction bearings of different diameters for rotatably mounting said spindle in said slide, the smaller of said anti-friction bearings being primarily a radial bearing and being mounted in said slide at a point intermediate the head of the spindle and said cam, the larger of said anti-friction bearings being primarily a thrust bearing and being interposed between said enlarged head and said slide, a relatively stationary follower mounted on the frame to engage said cam, a disc gear cutter secured to said enlarged head, and means for rotating the spindle to rotate said cutter and effect reciprocation of said slide.

ERNEST WILDHABER.